(12) United States Patent
Kawahito

(10) Patent No.: US 7,523,448 B2
(45) Date of Patent: Apr. 21, 2009

(54) OPTIMIZING COMPILER

(75) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 10/940,541

(22) Filed: Sep. 13, 2004

(65) Prior Publication Data

US 2005/0071832 A1     Mar. 31, 2005

(30) Foreign Application Priority Data

Sep. 30, 2003    (JP)    ............................. 2003-339666

(51) Int. Cl.
*G06F 9/45* (2006.01)

(52) U.S. Cl. .................................. 717/151

(58) Field of Classification Search ...................... None
See application file for complete search history.

(56) References Cited

U.S. PATENT DOCUMENTS

| | | | | | |
|---|---|---|---|---|---|
| 5,664,193 | A | * | 9/1997 | Tirumalai | .................... 717/153 |
| 6,128,775 | A | * | 10/2000 | Chow et al. | .................. 717/156 |
| 6,934,943 | B2 | * | 8/2005 | Hundt et al. | ................. 717/159 |
| 2004/0154011 | A1 | * | 8/2004 | Wang et al. | .................. 717/158 |

OTHER PUBLICATIONS

Gupta, R. et al. "Register Pressure Sensitive Redundancy Elimination," Department of Computer Science, University of Pittsburgh, PA, 1999.
Knoop, J. et al. "The Power of Assignment Motion," Passau University and Kiel Institute, Germany, 1995.

* cited by examiner

*Primary Examiner*—Michael J Yigdall
(74) *Attorney, Agent, or Firm*—Scully, Scott, Murphy & Presser, P.C.; Gail H. Zarick, Esq.

(57) ABSTRACT

Provides methods, apparatus and systems for an optimizing compiler which optimizes load instructions to read out data from a memory in an object program targeted for optimization. In an example embodiment, an optimizing compiler includes partial redundancy eliminating means for performing partial redundancy elimination on load instructions to read out variable data from the memory so that spilling does not take place when the variables are assigned to the registers; backward register detecting means for detecting free registers, which are not assigned to any variable, along execution paths traced in reverse order of execution, starting backward from use instructions to use data read out by the load instructions and extending to the load instructions; and free register assigning means for assigning the free registers detected by the backward register detecting means to target variables to be read out by the load instructions.

1 Claim, 6 Drawing Sheets

FIG.5

(a)
```
do {
    r5 = ...
       = ... r1
    r1 = spillin1;
    r4 = [r1];
       = ... r4
    r2 = spillin1;
    r2 = r2 + r5;
       = ... r2
} while(...);
```

(b)

```
T = spillin1;
do {
    r5 = ...
       = ... r1
    r4 = [T];
       = ... r4
    r2 = T + 5;
       = ... r2
} while(...);
```

FREE REGISTERS

{ r2, r3 }

{ r2, r3 }

{ r2, r3 } —— 600

(c)

```
T = spillin1;
do {
    r5 = ...
       = ... r1
    r4 = [T];
       = ... r4
    r2 = T + 5;
       = ... r2
} while(...);
```

FREE REGISTERS

{ r2, r3 }

{ r3 }

{ r3 } —— 610

OPTIMIZING COMPILER

TECHNICAL FIELD

The present invention relates to an optimizing compiler, a compiler program, and a recording medium. More particularly, the present invention relates to an optimizing compiler which optimizes load instructions to read out data from a memory, a compiler program, and a recording medium.

BACKGROUND OF THE INVENTION

Recently, technical innovation has yielded higher operating speeds of central processing units (CPUs) of computers. Thus, the time required for memory access is relatively longer than the time taken to read out data from registers of the CPU. To improve processing speed of the entire program, it is increasingly important to hold as many variable values for use in the program as possible in registers so as to reduce the number of memory accesses.

Conventionally, an optimizing compiler has a register assignment function for effectively assigning variables in an object program targeted for optimization to registers in order to reduce the number of memory accesses and improve the efficiency of the overall processing. The optimizing compiler causes the registers to hold variable values assigned to the registers and the memory to store variable values judged as being unassignable to the register. The optimizing compiler generates spill-in instructions to read out the variable values from the memory, prior to instructions to refer to the variable values stored in the memory.

The following documents are considered:
[Non-Patent Document 1] J. Knoop et al., "The Power of Assignment Motion," PLDI '95
[Non-Patent Document 2] R. Gupta and R. Bodik, "Register Pressure Sensitive Redundancy Elimination," Proceedings of the 8th International Conference on Compiler Construction, LNCS 1575, pp. 107-121 (1999).

Meanwhile, a redundancy elimination technique is used in recent optimizing compilers to improve the efficiency of the overall processing by eliminating redundant instructions among the plurality of instructions. In many cases, the optimizing compilers change instruction execution locations in order to effectively eliminate redundancy. To change instruction execution locations, a technique has been conventionally used to perform control so as not to generate additional variables which store the operation results of the instructions. (See Non-Patent Document 1). An alternative technique has been proposed to change instruction execution locations within a range that additional spilling does not take place even when variables are assigned to registers. (See Non-Patent Document 2).

The above-mentioned techniques of redundancy elimination are applicable to the spill-in instructions. However, according to Non-Patent Document 1, there is a problem that the range of a change in spill-in instruction execution locations is limited when target registers, from which data is to be read out by spill-in instructions, are used by other instructions. The technique described in Non-Patent Document 2 cannot determine registers assigned to variables although the technique can detect the range that permits a change in the instruction execution locations for instructions targeted for redundancy elimination.

SUMMARY OF THE INVENTION

It is therefore an aspect of the present invention to provide an optimizing compiler, a compiler program, and a recording medium, which are capable of overcoming the foregoing problems. This aspect is achieved by combinations of features as set forth in independent claims of the appended claims. Dependent claims thereof define further specific advantageous examples of the present invention.

In order to solve the foregoing problems, another aspect of the invention is to provide an optimizing compiler which optimizes load instructions to read out data from a memory in an object program targeted for optimization, including: partial redundancy eliminating means for performing partial redundancy elimination on the load instructions to read out variable data from the memory in the object program whose variables are at least in part unassigned to registers so that spilling does not take place when the variables are assigned to the registers; backward register detecting means for detecting free registers, which are not assigned to any variable, along execution paths traced in reverse order of execution, starting backward from use instructions to use data read out by the load instructions and extending to the load instructions; and free register assigning means for assigning the free registers detected by the backward register detecting means to target variables from which the load instructions read out the data. The aspect of the invention also provides a compiler program which allows a computer to function as the optimizing compiler, and a recording medium having the compiler program recorded thereon.

According to the present invention, load instructions can be efficiently optimized to read out data from a memory.

BRIEF DESCRIPTION OF THE DRAWINGS

For a more complete understanding of the present invention and the advantage thereof, reference is now made to the following description taken in conjunction with the accompanying drawings, in which:

FIGS. 5A to 5C show a second example of application of the embodiment; and

DETAILED DESCRIPTION OF THE INVENTION

The present invention provides methods, systems and apparatus for an optimizing compiler, a compiler program, and a recording medium. In an example embodiment, the invention provides an optimizing compiler which optimizes load instructions to read out data from a memory in an object program targeted for optimization. The compiler includes: partial redundancy eliminating means for performing partial redundancy elimination on the load instructions to read out variable data from the memory in the object program whose variables are at least in part unassigned to registers so that spilling does not take place when the variables are assigned to the registers; backward register detecting means for detecting free registers, which are not assigned to any variable, along execution paths traced in reverse order of execution, starting backward from use instructions to use data read out by the load instructions and extending to the load instructions; and free register assigning means for assigning the free registers detected by the backward register detecting means to target variables from which the load instructions read out the data. According to the present invention, load instructions can be efficiently optimized to read out data from a memory.

Although the present invention will be described below with reference to particular embodiments of the invention, it is to be understood that the following embodiments do not limit the invention, and that all combinations of features as discussed in the description of the embodiment are not necessarily essential for means of the invention for solving the problems.

Figure 1:
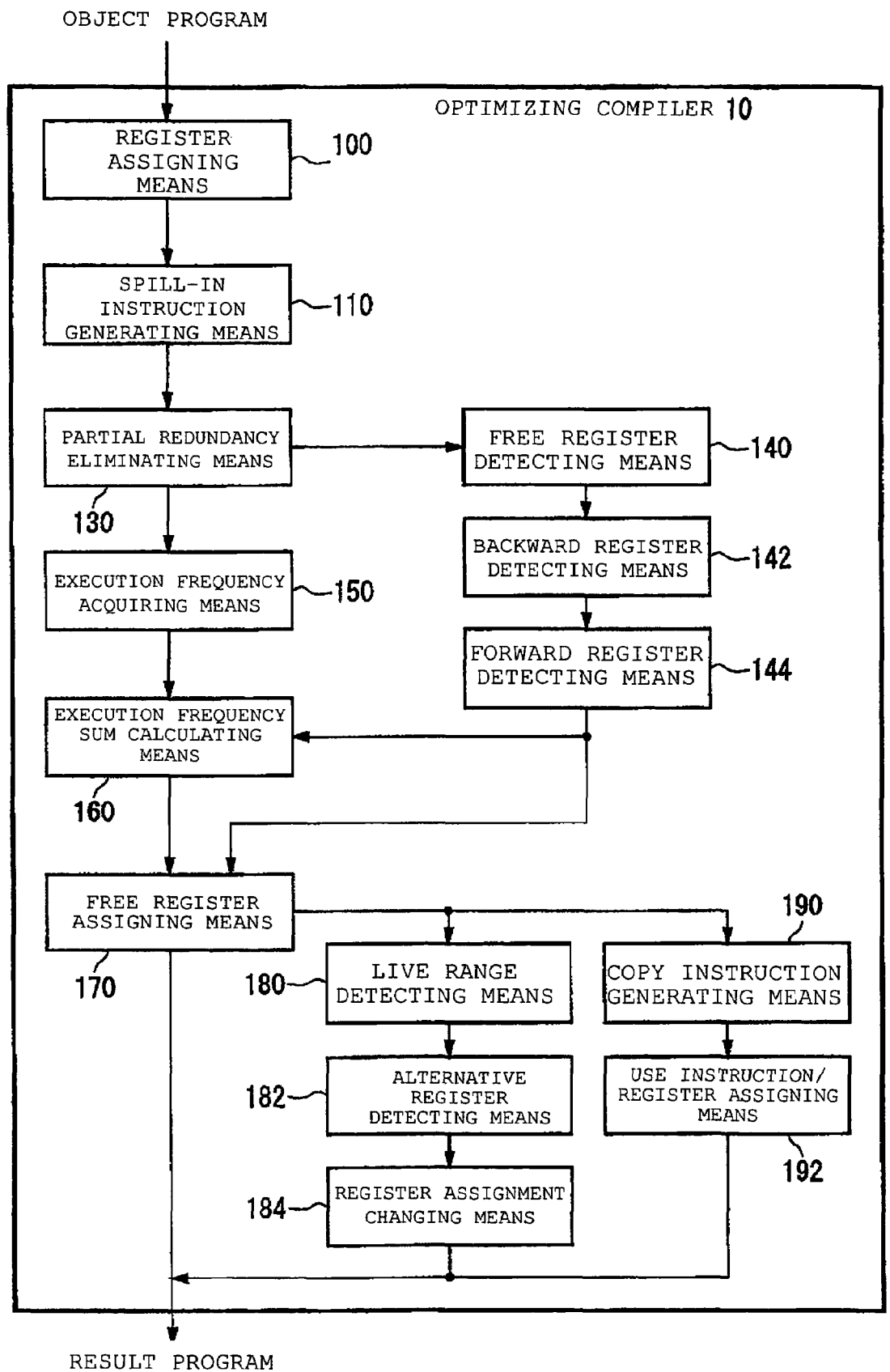
FIG. 1 is a functional block diagram of an optimizing compiler 10.

FIG. 1 is a functional block diagram of an optimizing compiler 10. The optimizing compiler 10 optimizes load instructions to read out data from a memory in an object program targeted for optimization. The optimizing compiler 10 includes register assigning means 100, spill-in instruction generating means 110, partial redundancy eliminating means 130, free register detecting means 140, backward register detecting means 142, forward register detecting means 144, execution frequency acquiring means 150, execution frequency sum calculating means 160, free register assigning means 170, live range detecting means 180, alternative register detecting means 182, register assignment changing means 184, copy instruction generating means 190, and use instruction/register assigning means 192.

The optimizing compiler 10 assigns a plurality of variables contained in the object program to registers and generates spill-in instructions to load the values of variables judged as being unassignable from the memory. When the plurality of spill-in instructions are redundant instructions which perform the same processing, the optimizing compiler 10 performs partial redundancy elimination to improve the efficiency of the overall processing by eliminating at least part of the plurality of spill-in instructions. Then, the optimizing compiler 10 acquires the sets of free registers available to be assigned to target variables, readout destinations of the plurality of spill-in instructions which have undergone the partial redundancy elimination. Then, the optimizing compiler 10 assigns the registers to the target variables.

An aspect of the optimizing compiler 10 according to the embodiment is to efficiently optimize load instructions by narrowing down the detected sets of free registers and assigning appropriate registers to the target variables.

Herein, the object program is, for example, intermediate representation indicating a program targeted for optimization within the optimizing compiler 10, and examples thereof include Java (registered trademark) bytecode, RTL (register transfer language), and quadruple representation. Alternatively, the object program may be a source code of a program. Variables are not limited to variables themselves in a source code and may be, for example, the live range of values in the object program.

The registers are not limited to all available registers that can be used by a central processing unit (CPU) which executes the object program. It is only necessary to include the registers in groups of registers which are predefined according to a specification of an operating system, a programming language, or the like of an information processing unit and permitted to be used by the object program. For example, the registers do not have to include registers which can change in their contents by being used by a library program or the like called from the object program.

Upon receipt of the object program, the register assigning means 100 assigns variables in the object program to registers and sends the resultant object program, which has undergone the assignment processing, to the spill-in instruction generating means 110. In this case, it is preferable that the register assigning means 100 assign variables to higher-priority registers based on the predetermined priority of assignment of a plurality of registers. With this arrangement, the register assigning means 100 can narrow registers to be assigned down to specific types of registers, and thus the number of free registers which can be consistently used in a predetermined execution path.

The spill-in instruction generating means 110 generates spill-in instructions for variables judged as being unassignable to the registers by the register assigning means 100 in the received object program. Then, the spill-in instruction generating means 110 sends the resultant object program, which has undergone the generation processing, to the partial redundancy eliminating means 130. Herein, the spill-in instructions are load instructions to load variable values from the memory, prior to instructions to use the variable values.

The partial redundancy eliminating means 130 performs partial redundancy elimination on the spill-in instructions which are the load instructions in the received object program. Specifically, the partial redundancy eliminating means 130 transfers each load instruction within a range including at least one free register, thereby performing partial redundancy elimination such that spilling does not take place when the variables are assigned to the registers. As an example, the partial redundancy eliminating means 130 can use the technique described in Non-Patent Document 2 to perform partial redundancy elimination. Furthermore, the partial redundancy eliminating means 130 replaces registers, which store data read out by the spill-in instructions, with variables used in the optimizing compiler 10.

Then, the partial redundancy eliminating means 130 sends the resultant object program, which has undergone the replacement processing, to the free register detecting means 140 and the execution frequency acquiring means 150.

As specific examples of processing, the partial redundancy eliminating means 130 may eliminate at least part of the plurality of load instructions or change instruction execution locations for at least part of the plurality of load instructions when a plurality of load instructions are redundant. Instead of performing partial redundancy elimination on the object program whose variables are already assigned to registers, the partial redundancy eliminating means 130 may perform partial redundancy elimination on the object program whose variables are at least in part unassigned to registers. More specifically, the partial redundancy eliminating means 130 may perform partial redundancy elimination on load instructions to read out variable data from the memory in such a manner that spilling does not take place when the variables are assigned to the registers. Herein, variables unassigned to registers may include not only variables unassigned to registers at the time of partial redundancy elimination, but also variables which are already assigned to registers but are to be finally assigned to different registers from the assigned registers in the processing of generating a result program from the object program.

The free register detecting means 140 detects the sets of free registers, which are not assigned to any variable, at load instruction execution locations and use instruction execution locations. Herein, use instructions refer to instructions to use data read out by load instructions. Then, the free register detecting means 140 sends the results of detection to the backward register detecting means 142. The backward register detecting means 142 detects free registers, which are not assigned to any variable among the sets of free registers detected by the free register detecting means 140, along execution paths traced in reverse order of execution, starting backward from the use instructions and extending to the load instructions. Then, the backward register detecting means 142 sends the results of detection to the forward register detecting means 144. The forward register detecting means 144 detects free registers, which are not assigned to any variable among the sets of free registers detected by the backward register detecting means 142, along execution paths traced in order of execution, starting forward from the load instructions and extending to the use instructions. Then, the forward register detecting means 144 sends the results of detection to the execution frequency sum calculating means 160 and the free register assigning means 170.

The execution frequency acquiring means 150 acquires the frequencies of load instruction execution and the frequencies of use instruction execution in the object program received from the partial redundancy eliminating means 130. Then, the execution frequency acquiring means 150 sends the results of acquisition to the execution frequency sum calculating means 160. The execution frequency acquiring means 150 may use profiling technique, such as node profiling technique or edge profiling technique, to measure the frequencies of execution of a plurality of instructions contained in the object program and thereby acquire the frequencies of load instruction execution and use instruction execution. The execution frequency sum calculating means 160 calculates the sum of the frequencies of load instruction execution and use instruction execution received from the execution frequency acquiring means 150 for each of the free registers at the load instruction execution locations and the use instruction execution locations based on the results of free register detection received from the forward register detecting means 144. Then, the execution frequency sum calculating means 160 sends the results of calculation to the free register assigning means 170.

The free register assigning means 170 selects the free registers each having the maximum sum of the execution frequencies calculated by the execution frequency sum calculating means 160 from among the free registers at the load instruction execution locations, which are detected by both the backward register detecting means 142 and the forward register detecting means 144. The free register assigning means 170 assigns the selected registers to the target variables to be read out under the load instructions. Then, the free register assigning means 170 outputs the resultant object program, which has undergone the assignment processing, as the result program. Herein, the target variables may be the variables for use in the optimizing compiler 10, with which the registers storing data to be read out by the load instructions are replaced by the partial redundancy eliminating means 130.

However, when no free register is detected along the execution paths traced in reverse order of execution, starting backward from the use instructions and extending to the load instructions, the free register assigning means 170 assigns any of the free registers at the load instruction execution locations to the target variables and sends the resultant object program, which has undergone the assignment processing, to the live range detecting means 180 or the copy instruction generating means 190. For example, the free register assigning means 170 may assign, to the target variables, the free registers each having the maximum sum of the execution frequencies at the load instruction execution locations or the free registers each having the highest priority of assignment at the load instruction execution locations.

The live range detecting means 180 detects the live range of the values of variables previously assigned to the registers assigned to the target variables by the free register assigning means 170 in the received object program and sends the results of detection to the alternative register detecting means 182. The alternative register detecting means 182 detects alternative registers which are free registers in the live range detected by the live range detecting means 180 and sends the results of detection to the register assignment changing means 184. Upon receipt of the results of detection, the register assignment changing means 184 changes the registers assigned to the previously assigned variables to the alternative registers and outputs the resultant object program, which has undergone the changing processing, as the result program.

The copy instruction generating means 190 generates instructions to copy target variable data into the free registers each having the maximum sum of the execution frequencies, at the execution locations where the instructions are executed prior to instructions to substitute other variable data into the registers assigned to the target variables by the free register assigning means 170, along the execution paths from the load instructions to the use instructions in the received object program. Then, the copy instruction generating means 190 sends the resultant object program, which has undergone the generation processing, to the use instruction/register assigning means 192. Alternatively, the copy instruction generating means 190 may generate instructions to copy target variable data into the highest-priority free registers used by the register assigning means 100.

The copy instruction generating means 190 may also generate copy instructions immediately before the confluence of a plurality of execution paths so that the registers assigned to the target variables along the execution paths may coincide with one another at the confluence, in other words, a register image which is the set of the registers assigned to the target variables along one execution path may coincide with register images located along the other execution paths at the confluence. At this time, the copy instruction generating means 190 selects the registers, into which target variable data is to be copied, so as to minimize the sum of the execution frequencies along the execution paths, where the copy instructions are generated, based on the execution frequencies along the plurality of execution paths. Then, the use instruction/register assigning means 192 assigns the registers, copy destinations of the copy instructions, to the variables to be used by the use instructions in the received object program. Then, the use instruction/register assigning means 192 outputs the resultant object program, which has undergone the assignment processing, as the result program.

Note that the configuration shown in FIG. 1 is an example, and therefore, various changes may be made in the configuration shown in FIG. 1. For example, the optimizing compiler 10 may exclude either the backward register detecting means 142 or the forward register detecting means 144 or both. In this case, the free register assigning means 170 may assign, to the target variables to be read out by the load instructions, any of the sets of free registers detected by the free register detecting means 140 or the free registers detected by either the backward register detecting means 142 or the forward register detecting means 144.

For example, the optimizing compiler 10 does not have to include the live range detecting means 180, the alternative register detecting means 182 and the register assignment changing means 184. In this configuration, when no free register is detected along the execution paths traced in reverse order of execution, starting backward from the use instructions and extending to the load instructions, the free register assigning means 170 assigns any of the free registers at the load instruction execution locations to the target variables. Then, the free register assigning means 170 sends the resultant object program, which has undergone the assignment processing, to the copy instruction generating means 190.

According to the optimizing compiler 10 of the embodiment, partial redundancy elimination is performed by transferring the load instructions within the range including at least one free register. Registers to be assigned to the target variables to be read out by the load instructions are determined based on the frequencies of load instruction execution and use instruction execution. Thus, it is possible to optimize the load instructions more efficiently.

Figure 2:
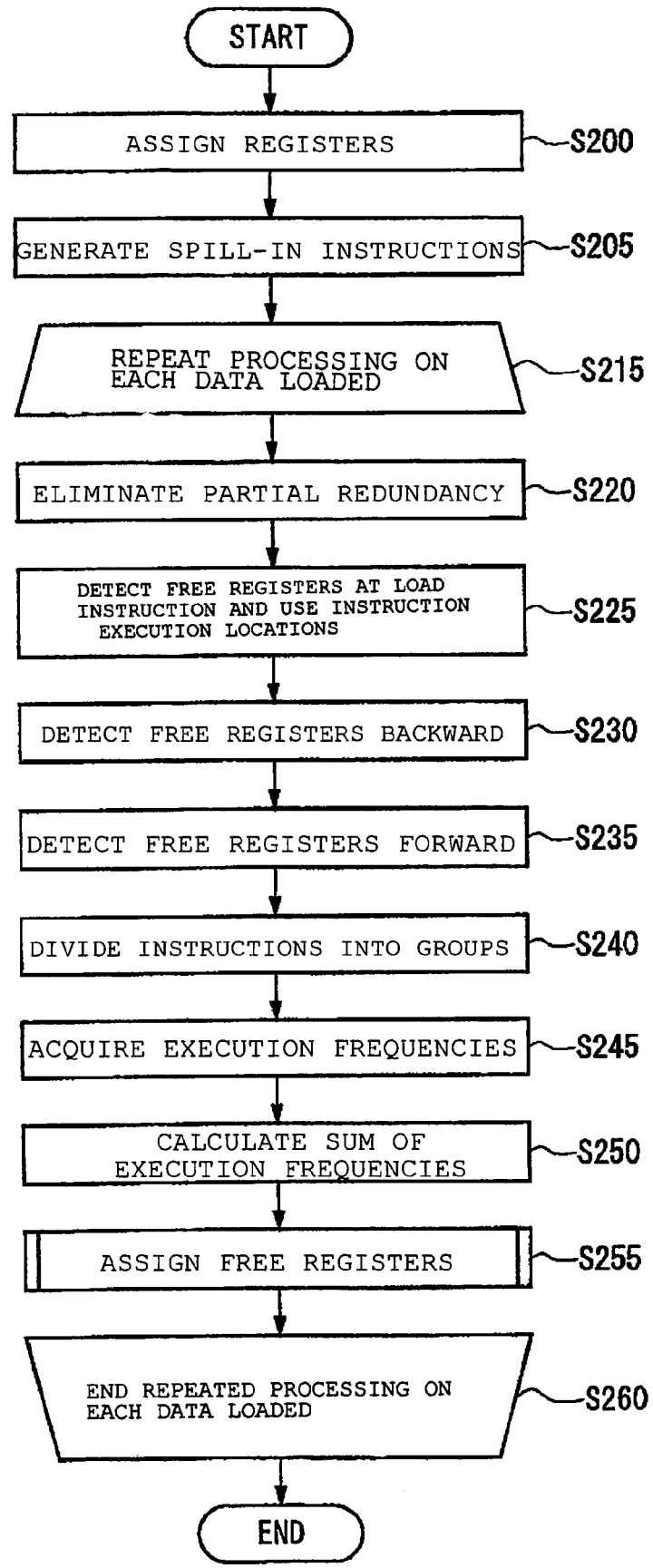
FIG. 2 is an operational flowchart of the optimizing compiler 10.

FIG. 2 is an operational flowchart of the optimizing compiler 10. First, the register assigning means 100 assigns variables in a received object program to registers (step S200). Then, the spill-in instruction generating means 110 generates spill-in instructions to load variable values from the memory prior to instructions to use the variable values, for variables judged as being unassignable to the registers by the register assigning means 100 (step S205).

Then, the optimizing compiler 10 repeatedly performs the following processing on each of a plurality of data loaded from different memory addresses by the spill-in instructions (step S215). First, the partial redundancy eliminating means 130 performs partial redundancy elimination on each of the plurality of spill-in instructions to load the data, and further, replaces registers, which store the data to be read out by the spill-in instructions, with variables for use in the optimizing compiler 10 (step S220).

Then, the free register detecting means 140 detects the sets REG(p) of free registers, which are not assigned to any variable, at execution locations p of load instructions and use instructions (step S225). Herein, use instructions use data read out by load instructions.

Herein, the optimizing compiler 10 generates the following three sets in each basic block of the object program.

(1) GEN Set

The optimizing compiler 10 generates the GEN set, that is, the set of registers which are not assigned to other variables by the register assigning means 100, within a range from the start location of basic block execution to the location where instructions to make final reference to variables are executed.

(2) GEN' Set

The optimizing compiler 10 generates the GEN' set, that is, the set of registers which are not assigned to other variables by the register assigning means 100, within a range from the load instruction execution location to the end location of basic block execution.

(3) KILL Set

The optimizing compiler 10 generates the KILL set, that is, the set of registers assigned to other variables by the register assigning means 100, in the basic block.

Hereinafter, the GEN set, the GEN' set, and the KILL set in the n-th basic block are expressed as GEN(n), GEN'(n), and KILL(n), respectively.

The backward register detecting means 142 detects free registers, which are not assigned to any variable, along execution paths traced in reverse order of execution, starting backward from the use instructions and extending to the load instructions, based on the results of detection performed by the free register detecting means 140 (step S230).

Specifically, the backward register detecting means 142 transmits information on the sets of free registers in a backward direction of the order of execution, starting from the end of the object program, and performs processing expressed as the following data-flow equation (1) using iteration method to cause a monotonic decrease in the number of free registers. In this manner, the backward register detecting means 142 detects the free registers.

In equation (1), $BWD\text{-}REG_{in}(n)$ represents the set of free registers at the start location of n-th basic block execution, and $BWD\text{-}REG_{out}(n)$ represents the set of free registers at the end location of n-th basic block execution.

[Equation 1] (1)
$$BWD - REG_{in}(n) = GEN(n) \cup (BWD - REG_{out}(n) - KILL(n))$$

$$BWD - REG_{out}(n) = \begin{cases} \text{(all available registers)}(n \text{ is end}) \\ \bigcap_{m \in Succ(n)} BWD - REG_{in}(m)(\text{otherwise}) \end{cases}$$

where Succ(n) represents the set of basic blocks which can be executed after the n-th basic block.

Furthermore, the backward register detecting means 142 acquires the sets of free registers at the instruction execution locations p in the n-th basic block based on $BWD\text{-}REG_{out}(n)$, GEN(n), and KILL(n). Then, the means 142 calculates the intersections of the acquired sets of free registers and the sets REG(p) of free registers detected by the free register detecting means 140. When the calculated intersections are not empty sets, the backward register detecting means 142 updates the sets REG(p) by replacing the sets REG(p) with the intersections.

Then, the forward register detecting means 144 detects free registers which are not assigned to any variable, along execution paths from the load instructions to the use instructions, based on the results of detection performed by the backward register detecting means 142 (step S235).

Specifically, the forward register detecting means 144 transmits information on the sets of free registers in a forward direction of the order of execution, starting from the start of the object program, and performs processing expressed as the following data-flow equation (2) using iteration method to cause a monotonic decrease in the number of free registers. In this manner, the forward register detecting means 144 detects the free registers.

In equation (2), $FWD\text{-}REG_{in}(n)$ represents the set of free registers at the start location of n-th basic block execution, and $FWD\text{-}REG_{out}(n)$ represents the set of free registers at the end location of n-th basic block execution.

[Equation 2] (2)
$$FWD - REG_{out}(n) = GEN'(n) \cup (FWD - REG_{in}(n) - KILL(n))$$

$$FWD - REG_{in}(n) = \begin{cases} \text{(all available registers)}(n \text{ is start}) \\ \bigcap_{m \in Pred(n)} FWD - REG_{out}(m)(\text{otherwise}) \end{cases}$$

where Pred(n) represents the set of basic blocks which can be executed before the n-th basic block.

Furthermore, the forward register detecting means 144 acquires the sets of free registers at the instruction execution locations p in the n-th basic block based on $FWD\text{-}REG_{in}(n)$, GEN'(n), and KILL(n). Then, the means 144 acquires the intersections of the acquired sets of free registers and the sets REG(p) of free registers updated by the backward register detecting means 142. When the acquired intersections are not empty sets, the forward register detecting means 144 updates the sets REG(p) by replacing the sets REG(p) with the intersections.

Herein, the order of execution of steps S230 and S235 is not limited to the above-mentioned order of execution. More specifically, the forward register detecting means 144 may detect free registers based on the results of detection performed by the free register detecting means 140, and thereafter the backward register detecting means 142 may detect free registers, based on the results of detection performed by the forward register detecting means 144.

The processing of either step S230 or S235 or both may be omitted. More specifically, the optimizing compiler 10 may detect free registers which include the sets of registers detected commonly by the free register detecting means 140 or the sets of registers detected by the free register detecting means 140 and either the backward register detecting means 142 or the forward register detecting means 144.

Then, the optimizing compiler 10 divides the load instructions and the plurality of use instructions to use data read out by the load instructions into groups (step S240). For example, the optimizing compiler 10 may use UD/DU chain technique or Web-based technique to divide the load instructions and the use instructions into groups. Subsequently, the execution frequency acquiring means 150 acquires the frequencies of load instruction execution and the frequencies of use instruction execution (step S245).

Next, the execution frequency sum calculating means 160 calculates the sum of the frequencies of load instruction execution for each of the free registers at the load instruction execution locations and calculates the sum of the frequencies of use instruction execution for each of the free registers at the use instruction execution locations (step S250). Specifically, the execution frequency sum calculating means 160 associates a plurality of registers contained in the set REG(p) at the instruction execution location p with the frequencies of instruction execution for each of a plurality of instructions belonging to the same group. Then, the execution frequency sum calculating means 160 obtains the sum of the execution frequencies by summing the execution frequencies associated with the registers at each execution location, for each of all available registers that can be used by the object program. When a plurality of registers have the equal sum of the execution frequencies, the execution frequency sum calculating means 160 can also adjust the sums of the execution frequencies so that the sums may be different from one another.

Then, the free register assigning means 170 assigns any of the free registers to the target variables from which the load instructions read out data (step S255). The optimizing compiler 10 repeats the above processing on a plurality of data loaded from different memory addresses by the spill-in instructions (step S260).

As described above and shown in FIG. 2, the optimizing compiler 10 can assign the variables, which are judged as being unassignable to the registers by the register assignment processing, to the registers which are not yet assigned to any variable even after the end of the register assignment processing. This reduces the number of spill-in instruction executions, and thus it is possible to improve the efficiency of execution of the overall object program.

Figure 3:
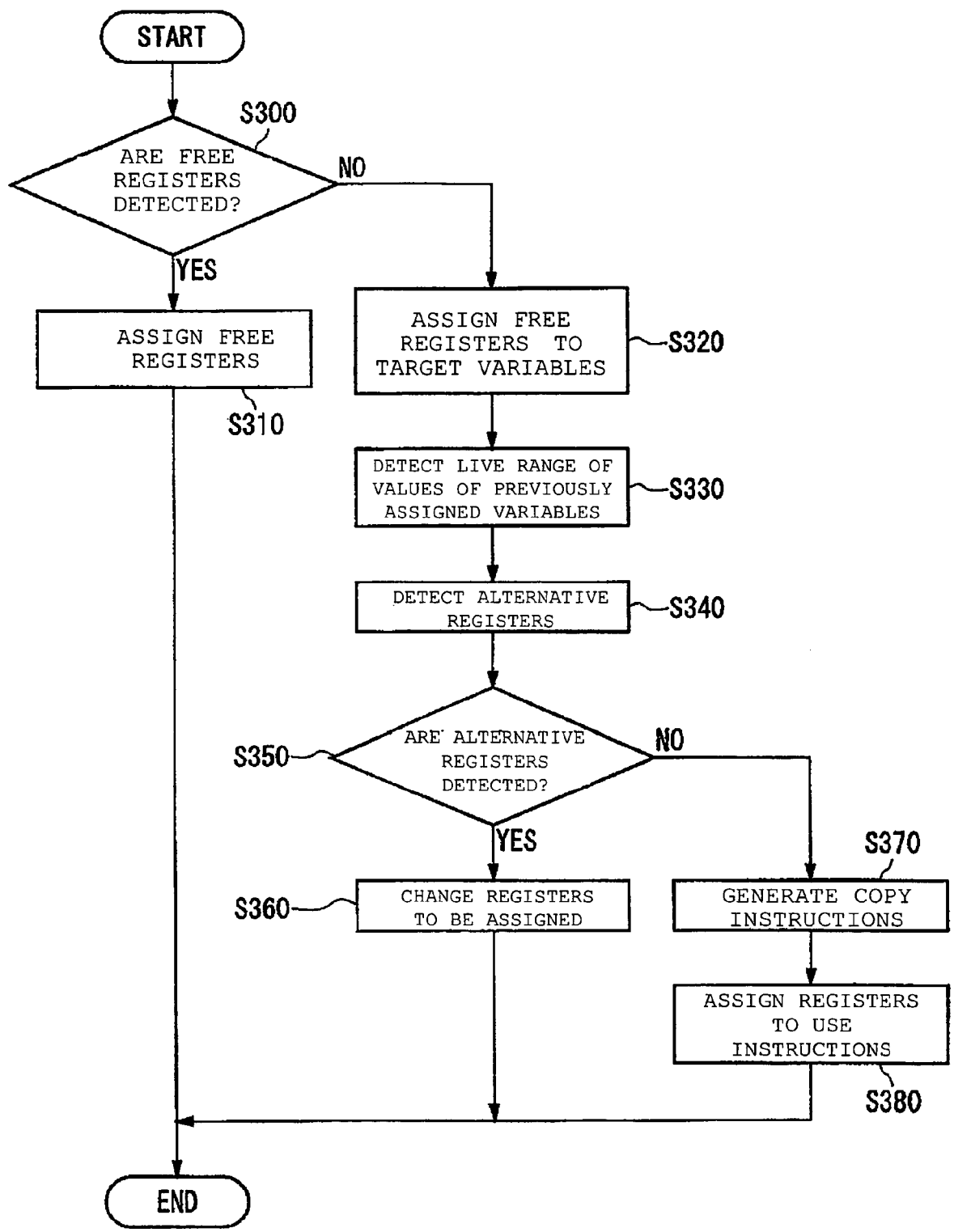
FIG. 3 is an operational flowchart showing the details of step S255 shown in FIG. 2.

FIG. 3 is an operational flowchart showing the details of step S255 shown in FIG. 2. The free register assigning means 170 determines whether free registers, which are consistently available along all execution paths traced in reverse order of execution, starting backward from the use instructions and extending to the load instructions, are detected (step S300).

When free registers are detected (YES in step S300), the free register assigning means 170 selects the free registers, which are consistently available along all the execution paths traced in reverse order of execution, starting backward from the use instructions and extending to the load instructions, and which have the maximum sum of the execution frequencies, from among the sets REG(p) of free registers at the load instruction execution locations p. Then, the means 170 assigns the selected registers to the target variables, the readout destinations of the load instructions (step S310). Then, the processing ends.

When no free register is detected (NO in step S300), the free register assigning means 170 assigns, to the target variables, the registers each having the maximum sum of the execution frequencies, which are selected from among the sets REG(p) of free registers at the load instruction execution locations p (step S320). Then, the live range detecting means 180 detects the live range of the values of variables previously assigned to the registers assigned to the target variables by the free register assigning means 170 (step S330). The means 180 performs the following processing on the detected live range. When a plurality of live ranges are detected, the live range detecting means 180 may perform the following processing on each of the detected live ranges.

The alternative register detecting means 182 detects alternative registers which are free registers in the live range detected by the live range detecting means 180 (step S340). When the alternative register detecting means 182 succeeds in detecting alternative registers (YES in step S350), the register assignment changing means 184 changes the registers assigned to the previously assigned variables to the alternative registers (step S360). Then, the processing ends.

On the other hand, when the alternative register detecting means 182 fails to detect alternative registers (NO in step S350), the copy instruction generating means 190 generates instructions to copy target variable data into the free registers each having the maximum sum of the execution frequencies, at the execution locations where the instructions are executed prior to instructions to substitute other variable data into the registers assigned to the target variables, along the execution paths from the load instructions to the use instructions (step S370).

Subsequently, the use instruction/register assigning means 192 assigns the registers, copy destinations of the copy instructions, to the variables to be used by the use instructions (step S380). Then, the processing ends.

As described above and shown in FIG. 3, when there are detected the registers which are not consistently assigned to other variables in the range of the variable values between the load instructions and the use instructions, the optimizing compiler 10 selects the detected registers as the registers to hold the variable values. Furthermore, even when there are not detected the free registers which are not consistently assigned to other variables, the optimizing compiler 10 tries to change the registers previously assigned to other variables to other registers. As a result, the optimizing compiler 10 can enhance the efficiency of execution of the object program by minimizing the occurrence of the processing of copying the value from one register into another.

Figure 4:
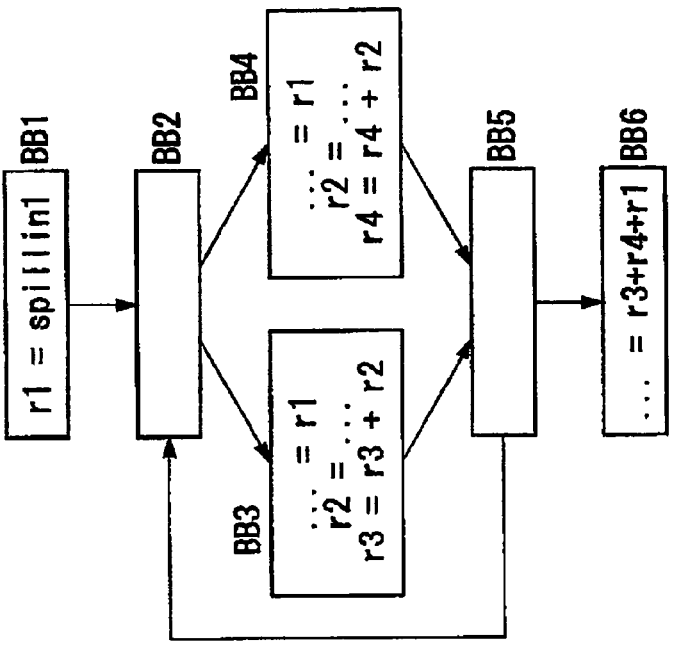
FIGS. 4A to 4E show a first example of application of an embodiment.
Figure 4:
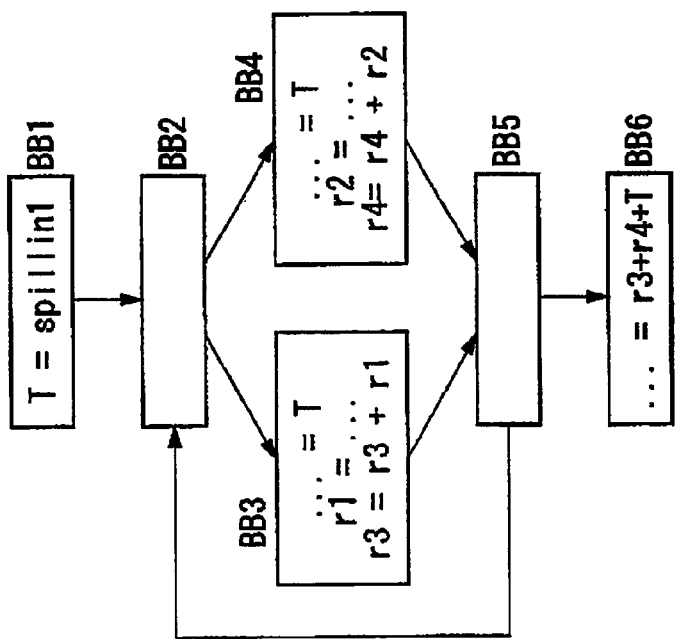
Figure 4:
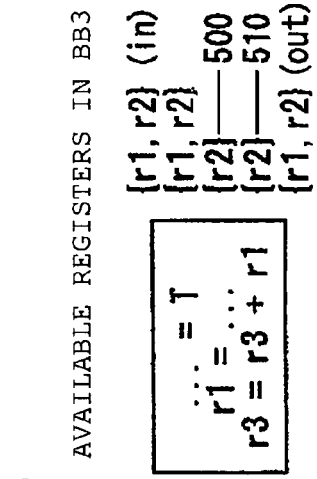

FIGS. 4A to 4E show a first example of application of the embodiment. FIG. 4A shows the object program of the example of application after the execution of step S220 of FIG. 2. FIG. 4B shows the object program of the example of application after the execution of step S255 of FIG. 2. FIG. 4C shows the respective GEN sets and KILL sets in a plurality of basic blocks contained in the object program of the example of application. FIG. 4D shows the results of detection, which are obtained when the backward register detecting means 142 detects free registers in a plurality of basic blocks contained in the object program of the example of application. The description will be given below with regard to the procedure for obtaining the results shown in FIG. 4D using the data-flow equation (1).

First, the backward register detecting means 142 detects all available registers {r1, r2, r3, r4} as the set BWD-REG$_{out}$ (BB6) of free registers at the end locations of execution of a basic block BB6, the end of the object program. Then, the backward register detecting means 142 detects {r1, r2}, which is the union of {r1, r2} resultant from subtraction of KILL(BB6) {r3, r4} from BWD-REG$_{out}$(BB6) {r1, r2, r3, r4} and GEN(BB6) {r1, r2}, as the set BWD-REG$_{in}$(BB6) of free registers at the start locations of execution of the basic block BB6.

Then, the backward register detecting means 142 detects BWD-REG$_{in}$(BB6) {r1, r2} as the set BWD-REG$_{out}$(BB5) of free registers at the end location of execution of a basic block BB5. Herein, basic blocks to be executed after the basic block BB5 include a basic block BB2 besides the basic block BB6. However, the backward register detecting means 142 detects BWD-REG$_{out}$(BB5) based on only BWD-REG$_{in}$(BB6) because BWD-REG$_{in}$(BB2) is not yet detected at this time. The backward register detecting means 142 solves the data-flow equation (1) illustrated in FIG. 2 by using iteration method, and thus the means 142 detects BWD-REG$_{out}$(BB5) by using the set BWD-REG$_{in}$(BB2) of free registers at the looping execution start location and the set BWD-REG$_{in}$ (BB6) of free registers at the location to be executed after the looping. Thereafter, the backward register detecting means 142 performs calculation using the same procedure, thereby detecting the free registers shown in FIG. 4D as the free registers along the execution paths traced in reverse order of execution, starting backward from the use instructions and extending to the load instructions.

FIG. 4E shows free registers in a basic block BB3 of the object program of the example of application. Herein, FIG. 4E shows that the available register at execution locations 500 and 510 in the basic block BB3 is {r2}. When the free register is {r1} in a basic block other than the basic block BB3, e.g., a basic block BB4, the free register assigning means 170 cannot detect the free registers which are consistently available along all execution paths traced in reverse order of execution, starting backward from the use instructions in the basic block BB6 and extending to the load instructions in a basic block BB1.

Herein, the free register assigning means 170 assigns the register r1 to a target variable, the readout destination of the load instruction, in the basic block BB1. Then, the live range detecting means 180 detects that the live range of the value of a variable, which is previously assigned to the register r1 assigned to the target variable, in the basic block BB3 lies between the execution locations 500 and 510. Upon receipt of the results of detection, the alternative register detecting means 182 detects the register r2 as an alternative register which is a free register in the detected live range. Then, the register assignment changing means 184 changes the register r1 assigned to the previously assigned variable to the alternative register r2, thus making the register r1 available in the basic block BB3.

In the above-mentioned manner, the optimizing compiler 10 can generate the object program shown in FIG. 4B by consistently assigning a variable T to the register r1.

As the example of application illustrates, according to the optimizing compiler 10, it is possible to avoid generation of copy instructions by changing the registers assigned to the previously assigned variables to the alternative registers. Thus, it is possible to optimize the load instructions efficiently.

FIGS. 5A to 5C show a second example of application of the embodiment. FIG. 5A shows the object program of the second example of application after the execution of step S205 of FIG. 2. FIG. 5B shows an example of the object program of the second example of application after the execution of step S230 of FIG. 2. FIG. 5C shows one example of the object program of the second example of application after the execution of step S235 of FIG. 2.

The spill-in instruction generating means 110 generates the spill-in instructions for variables judged as being unassignable to registers by the register assigning means 100. For example, as indicated by the fourth and seventh lines in FIG. 5A, the spill-in instruction generating means 110 generates the spill-in instructions prior to the use of variable values each time the variable values are used.

The backward register detecting means 142 detects free registers along an execution path traced in reverse order of execution, starting backward from an execution location 600 and extending to a spill-in instruction. Specifically, when the looping includes a use instruction, the backward register detecting means 142 detects free registers along a path where the first looping is to be executed. Consequently, as shown in FIG. 5B, the backward register detecting means 142 detects {r2, r3} as free registers along the execution path from the execution location 600 to the spill-in instruction.

On the other hand, the forward register detecting means 144 detects a free register along an execution path traced in order of execution, starting forward from a spill-in instruction and extending to an execution location 610. Specifically, when the looping includes a use instruction, the forward register detecting means 144 detects a free register along a path where the looping is repeatedly executed more than once. Consequently, the forward register detecting means 144 detects {r3} as a free register at the execution location 610.

As mentioned above, the results of free register detection obtained by either the backward register detecting means 142 or the forward register detecting means 144 may be different from the results of free register detection commonly obtained by both the backward register detecting means 142 and the forward register detecting means 144.

This may cause variations in the results of optimization performed by the optimizing compiler 10. For example, when the register r2 is selected as the register to be assigned to the variable T in FIG. 5B, the register r2 is used at the execution position 600 for other purposes. Therefore, the optimizing compiler 10 must generate a copy instruction at an execution location to be executed prior to the execution location 600. Specifically, the optimizing compiler 10 must generate a copy instruction to copy the value of the variable T into a register other than the register r2 so as to cause the register to hold the value. On the other hand, when the register r3 is selected as the register to be assigned to the variable T in FIG. 5C, the optimizing compiler 10 does not have to generate a copy instruction.

According to the optimizing compiler 10 of the second example of application, free registers detected by both the backward and forward register detecting means 142 and 144 are assigned to target variables to be read out by load instructions. Thus, generation of copy instructions are avoided, and thereby achieving efficient optimization of load instructions.

Figure 6:
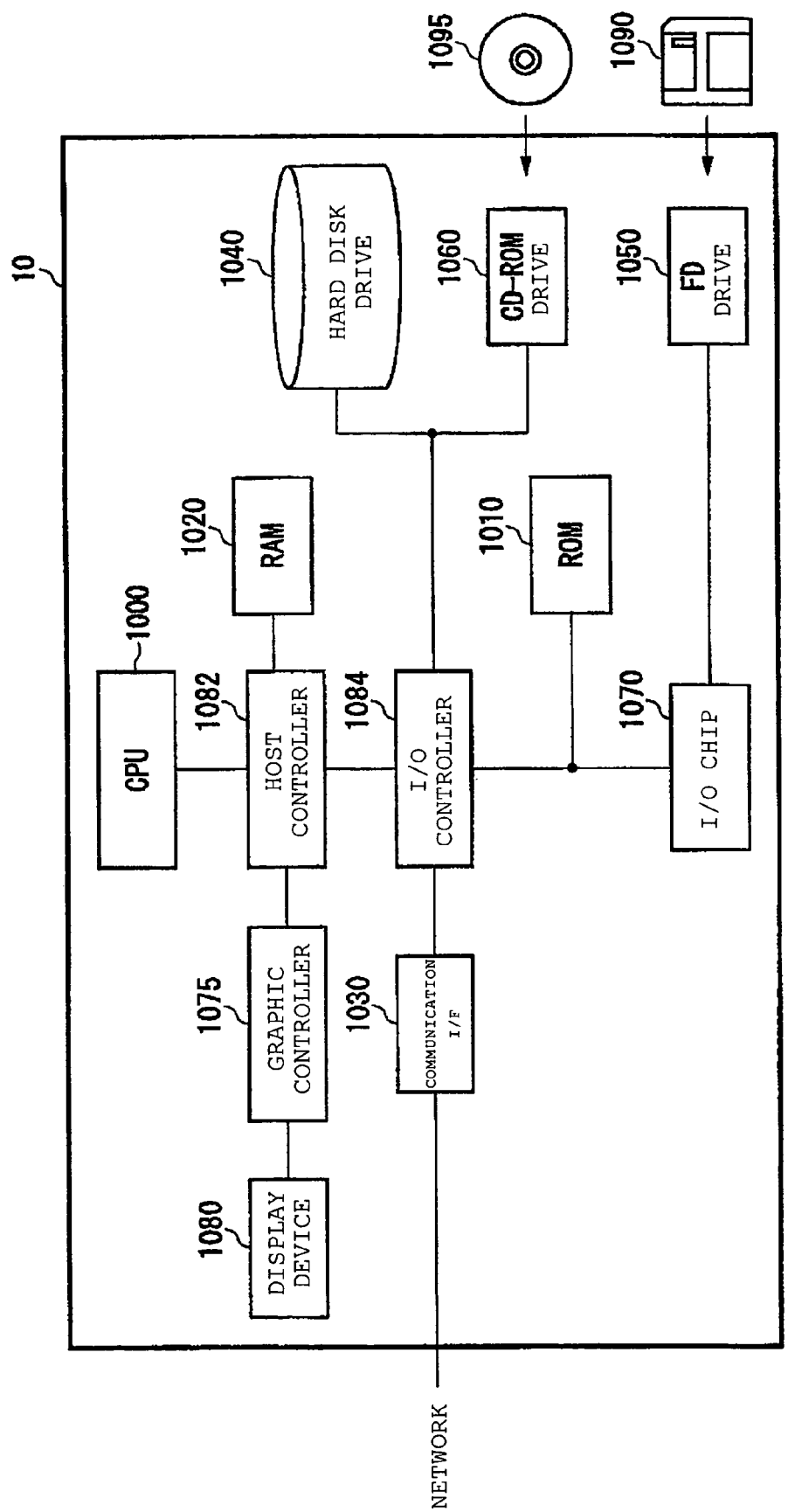
FIG. 6 is a block diagram showing an example of a hardware configuration of a computer which functions as the optimizing compiler 10.

FIG. 6 is a block diagram showing an example of a hardware configuration of a computer which functions as the optimizing compiler 10. The optimizing compiler 10 includes CPU and its peripheral devices including a CPU 1000, a RAM 1020, a graphic controller 1075, and a display device 1080, which are connected to one another via a host controller 1082; input/output units including a communication interface 1030, a hard disk drive 1040, and a CD-ROM drive 1060, which are connected to the host controller 1082 via an input/output controller 1084; and legacy input/output units including a ROM 1010, a flexible disk drive 1050, and an input/output chip 1070, which are connected to the input/output controller 1084.

The host controller 1082 provides connection between the RAM 1020 and the CPU 1000 and graphic controller 1075 which access the RAM 1020 at high transfer rate. The CPU 1000 operates in accordance with programs stored in the ROM 1010 and the RAM 1020 to control each unit. The graphic controller 1075 acquires image data which the CPU 1000 or the like generates in frame buffers within the RAM 1020, and the image data is displayed on the display device 1080. Alternatively, the graphic controller 1075 may contain frame buffers to store image data generated by the CPU 1000 or the like.

The input/output controller 1084 connects the host controller 1082 to the communication interface 1030, the hard disk drive 1040, and the CD-ROM drive 1060, which are the relatively high-speed input/output devices. The communication interface 1030 is connected to an external device via a network. The hard disk drive 1040 stores a compiler program and data used by the optimizing compiler 10. The CD-ROM drive 1060 reads out a program or data from a CD-ROM 1095 and provides the program or data to the input/output chip 1070 via the RAM 1020.

The ROM 1010 and the relatively low-speed input/output devices such as the flexible disk drive 1050 and the input/output chip 1070 are connected to the input/output controller 1084. The ROM 1010 stores a boot program which the CPU 1000 executes at the time of activating the optimizing compiler 10, a program which depends on the hardware of the optimizing compiler 10, and the like. The flexible disk drive 1050 reads out a program or data from a flexible disk 1090 and provides the program or data to the input/output chip 1070 via the RAM 1020. The input/output chip 1070 is connected to various types of input/output devices via the flexible disk 1090, and, for example, a parallel port, a serial port, a keyboard port, and a mouse port.

The compiler program to be provided to the optimizing compiler 10 is stored in a recording medium such as the flexible disk 1090, the CD-ROM 1095, or an IC card and provided by users. The compiler program is read out from the recording medium and is installed as well as executed in the optimizing compiler 10 via the input/output chip 1070 and/or the input/output controller 1084.

The compiler program, which is installed and executed in the optimizing compiler 10, includes a register assigning module, a spill-in instruction generating module, a partial redundancy eliminating module, a free register detecting module, a backward register detecting module, a forward register detecting module, an execution frequency acquiring module, an execution frequency sum calculating module, a free register assigning module, a live range detecting module, an alternative register detecting module, a register assignment changing module, a copy instruction generating module, and a use instruction/register assigning module. Since the operation of the modules acting on the optimizing compiler 10 is the same as the operation of corresponding components of the optimizing compiler 10 described with reference to FIGS. 1 to 5C, the descriptions thereof are omitted.

The above-mentioned compiler program may be stored in an external storage medium. Besides the flexible disk 1090 and the CD-ROM 1095, an optical recording medium such as a DVD or a PD, a magneto-optical recording medium such as an MD, a tape medium, a semiconductor memory such as an IC card, or the like can be used as the storage medium. A storage or memory such as a hard disk or a RAM in a server system connected to a dedicated communication network or the Internet may also be used as a recording medium to provide the compiler program to the optimizing compiler 10 via the network.

As apparent from the above description of the embodiment, the optimizing compiler 10 can assign the variables, which are judged as being unassignable to the registers by the register assignment processing, to the registers which are not yet assigned to any variable even after the end of the register assignment processing. This reduces the number of spill-in instruction executions, thereby improving the efficiency of execution of the overall object program.

Moreover, the optimizing compiler 10 changes the registers, previously assigned to the variables by the register assignment processing, to other registers. Accordingly, the optimizing compiler 10 can reduce the number of copy instructions to copy the value from one register into another. Furthermore, even when the previously assigned registers cannot be changed to other registers, the optimizing compiler 10 can give higher priority of assignment to the free registers at the execution locations where instructions having the greater frequencies of execution are executed, and therefore the optimizing compiler 10 can improve the efficiency of execution of the object program.

Although the present invention has been described above by referring to the embodiment, the technical scope of the present invention is not limited to the above-mentioned embodiment. It is obvious to those skilled in the art that various changes or modifications can be made in the above-mentioned embodiment. It is apparent from the appended claims that the technical scope of the present invention also covers such changes or modifications.

According to the above-mentioned embodiment, an optimizing compiler, a compiler program, and a recording medium are implemented as described in each item below.

(Item 1) An optimizing compiler which optimizes load instructions to read out data from a memory in an object program targeted for optimization, including: partial redundancy eliminating means for performing partial redundancy elimination on the load instructions to read out variable data from the memory in the object program whose variables are at least in part unassigned to registers so that spilling does not take place when the variables are assigned to the registers; backward register detecting means for detecting free registers, which are not assigned to any variable, along execution paths traced in reverse order of execution, starting backward from use instructions to use data read out by the load instructions and extending to the load instructions; and free register assigning means for assigning the free registers detected by the backward register detecting means to target variables from which the load instructions read out the data.

(Item 2) The optimizing compiler according to Item 1, wherein the backward register detecting means transmits information indicating sets of the free registers in a backward direction of the order of execution, starting from an end of the object program, and performs processing expressed as a dataflow equation, using iteration method to cause a monotonic decrease in a number of the free registers, to detect the free registers.

(Item 3) The optimizing compiler according to Item 1, wherein when no free register is detected along the execution paths traced in reverse order of execution, starting backward from the use instructions and extending to the load instructions, the free register assigning means assigns, to the target variables, any of the free registers at load instruction execution locations, and the optimizing compiler further includes: live range detecting means for detecting a live range of values of variables previously assigned to the registers assigned to the target variables; alternative register detecting means for detecting alternative registers which are the free registers in the live range; and register assignment changing means for changing the registers assigned to the previously assigned variables to the alternative registers.

(Item 4) The optimizing compiler according to Item 1, further including: register assigning means for assigning the variables to the registers; and spill-in instruction generating means for generating spill-in instructions for variables judged as being unassignable to the registers by the register assigning means, the spill-in instructions loading variable values from the memory, prior to instructions to use the variable values, wherein the partial redundancy eliminating means performs the partial redundancy elimination on the spill-in instructions which are the load instructions, and further, replaces registers, which store data to be read out by the spill-in instructions, with variables for use in the optimizing compiler, and the free register assigning means assigns the free registers detected by the backward register detecting means to the variables replaced by the partial redundancy eliminating means.

(Item 5) The optimizing compiler according to Item 4, wherein a priority of assignment of the variables to a plurality of the registers is predefined, the register assigning means assigns the variables to higher-priority registers, and when no free register is detected along the execution paths traced in the reverse order of execution, starting backward from the use instructions and extending to the load instructions, the free register assigning means assigns, to the target variables, highest-priority free registers among the free registers at the load instruction execution locations, the optimizing compiler further includes: copy instruction generating means for generating instructions to copy target variable data into the highest-priority free registers at execution locations where instructions are executed prior to instructions to substitute other variable data into the registers assigned to the target variables, along execution paths from the load instructions to the use instructions; and use instruction/register assigning means for assigning the registers, copy destinations of the copy instructions, to the variables to be used by the use instructions.

(Item 6) The optimizing compiler according to Item 1, further including: forward register detecting means for detecting free registers, which are not assigned to any variable, along execution paths traced in order of execution, starting forward from the load instructions and extending to the use instructions to use data read out by the load instructions, wherein the free register assigning means assigns, to the target variables, the free registers detected by both the backward register detecting means and the forward register detecting means.

(Item 7) An optimizing compiler which optimizes load instructions to read out data from a memory in an object program targeted for optimization, including: partial redundancy eliminating means for performing partial redundancy elimination on the load instructions to read out variable data from the memory in the object program whose variables are at least in part unassigned to registers so that spilling does not take place when the variables are assigned to the registers; forward register detecting means for detecting free registers, which are not assigned to any variable, along execution paths traced in order of execution, starting forward from the load instructions and extending to use instructions to use data read out by the load instructions; and free register assigning means for assigning the free registers detected by the forward register detecting means to target variables from which the load instructions read out the data.

(Item 8) The optimizing compiler according to Item 7, wherein the forward register detecting means transmits information indicating sets of the free registers in a forward direction of the order of execution, starting from a start of the object program, and performs processing expressed as a dataflow equation, using iteration method to cause a monotonic decrease in a number of the free registers, to detect the free registers.

(Item 9) An optimizing compiler which optimizes load instructions to read out data from a memory in an object program targeted for optimization, including: partial redundancy eliminating means for performing partial redundancy elimination on the load instructions to read out variable data from the memory in the object program whose variables are at least in part unassigned to registers so that spilling does not take place when the variables are assigned to the registers; execution frequency acquiring means for acquiring frequencies of the load instruction execution and frequencies of use instruction execution, use instructions using data read out by the load instructions; free register detecting means for detecting sets of the free registers, which are not assigned to any variable, at load instruction execution locations and use instruction execution locations; execution frequency sum calculating means for calculating a sum of the frequencies of load instruction execution and a sum of the frequencies of use instruction execution for each of the free registers at the load instruction locations or the use instruction execution locations; and free register assigning means for assigning free registers to target variables, readout destinations of the load instructions, the free registers having a maximum sum of the execution frequencies among the free registers at the load instruction execution locations.

(Item 10) The optimizing compiler according to Item 9, further including: copy instruction generating means for generating instructions to copy target variable data into the free registers each having the maximum sum of the execution frequencies, at execution locations where instructions are executed prior to instructions to substitute other variable data into the registers assigned to the target variables, along execution paths from the load instructions to the use instructions; and use instruction/register assigning means for assigning the registers, copy destinations of the copy instructions, to the variables to be used by the use instructions.

(Item 11) A compiler program which allows a computer to function as an optimizing compiler for optimizing load instructions to read out data from a memory in an object program targeted for optimization, the compiler program allowing the computer to function as: partial redundancy eliminating means for performing partial redundancy elimination on the load instructions to read out variable data from the memory in the object program whose variables are at least in part unassigned to registers so that spilling does not take place when the variables are assigned to the registers; backward register detecting means for detecting free registers, which are not assigned to any variable, along execution paths traced in reverse order of execution, starting backward from use instructions to use data read out by the load instructions and extending to the load instructions; and free register assigning means for assigning the free registers detected by the backward register detecting means to target variables from which the load instructions read out the data.

(Item 12) A compiler program which allows a computer to function as an optimizing compiler for optimizing load instructions to read out data from a memory in an object program targeted for optimization, the compiler program allowing the computer to function as: partial redundancy eliminating means for performing partial redundancy elimination on the load instructions to read out variable data from the memory in the object program whose variables are at least in part unassigned to registers so that spilling does not take place when the variables are assigned to the registers; forward register detecting means for detecting free registers, which are not assigned to any variable, along execution paths traced in order of execution, starting forward from the load instructions and extending to use instructions to use data read out by the load instructions; and free register assigning means for assigning the free registers detected by the forward register detecting means to target variables from which the load instructions the data.

(Item 13) A compiler program which allows a computer to function as an optimizing compiler for optimizing load instructions to read out data from a memory in an object program targeted for optimization, the compiler program allowing the computer to function as: partial redundancy eliminating means for performing partial redundancy elimination on the load instructions to read out variable data from the memory in the object program whose variables are at least in part unassigned to registers so that spilling does not take place when the variables are assigned to the registers; execution frequency acquiring means for acquiring frequencies of the load instruction execution and frequencies of use instruction execution, the use instructions using data read out by the load instructions; free register detecting means for detecting sets of the free registers, which are not assigned to any variable, at load instruction execution locations and use instruction execution locations; execution frequency sum calculating means for calculating a sum of the frequencies of load instruction execution and a sum of the frequencies of use instruction execution for each of the free registers at the load instruction locations or the use instruction execution locations; and free register assigning means for assigning free registers to target variables, readout destinations of the load instructions, the free registers having a maximum sum of the execution frequencies among the free registers at the load instruction execution locations.

(Item 14) A recording medium having a compiler program according to any one of Items 11 to 13 recorded thereon.

Although particular embodiments of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A compiling method comprising optimizing load instructions to read out data from a memory in an object program targeted for optimization, the step of optimizing comprising the steps of:

performing partial redundancy elimination on the load instructions to read out variable data from the memory in the object program whose variables are at least in part unassigned to registers so that spilling does not take place when the variables are assigned to the registers;

acquiring frequencies of the load instruction execution and frequencies of use instruction execution, the use instructions using data read out by the load instructions;

detecting, by a free register detecting means, sets of the free registers, which are not assigned to any variable, at load instruction execution locations and use instruction execution locations;

detecting by a backward register detecting means, free registers, which are not assigned to any variable, along execution paths traced in reverse order of execution, starting backward from use instructions to use data read out by the load instructions and extending to the load instructions;

detecting, by a forward register detecting means, free registers, which are not assigned to any variable, along execution paths traced in order of execution, starting forward from the load instructions and extending to use instructions to use data read out by the load instructions;

updating said free register sets by one or more of: said backward register detecting means, and forward register detecting means, said updating including calculating intersections of the sets of free registers obtained by said free register detecting means with said free registers detected by either said forward register detecting means or said backward register detecting means;

calculating a sum of the frequencies of load instruction execution and a sum of the frequencies of use instruction execution for each of the free registers at the load instruction locations or the use instruction execution locations; and, assigning the updated free registers to target variables from which the load instructions read out the data, the updated free registers having a maximum sum of the execution frequencies among the free registers at the load instruction execution locations, wherein the target variables are assigned, which are judged as being unassignable to registers by a register assignment processing, to registers which are not yet assigned to any variable even after the end of the register assignment processing.

* * * * *